United States Patent [19]

Rabinovich et al.

[11] 3,864,332
[45] Feb. 4, 1975

[54] METHOD OF PREPARING α-AMINOBENZYLPENICILLIN

[76] Inventors: Meri Solomonovna Rabinovich, ulitsa 1812 Goda, 2, kv. 168; Leonard Sergeevich Povarov, ulitsa Krasikova 19, kv. 28; Galina Sergeevna Pavljuk, Euranskaya ulitsa, 26, korp. 1, kv. 140, all of Moscow, U.S.S.R.

[22] Filed: May 18, 1972

[21] Appl. No.: 254,677

[30] Foreign Application Priority Data
May 18, 1971 U.S.S.R. .............................. 1651444
Apr. 24, 1972 U.S.S.R. .............................. 1772937

[52] U.S. Cl. .............................. 260/239.1, 424/271
[51] Int. Cl. ............................................. C07d 99/16
[58] Field of Search ................................. 260/239.1

[56] References Cited
UNITED STATES PATENTS
2,985,648    5/1961   Doyle et al. ....................... 260/239.1
3,282,926   11/1966   Brain et al. ....................... 260/239.1
3,453,263    7/1969   Dvonch et al. ..................... 260/239.1
3,651,050    3/1972   Nakanishi ......................... 260/239.1
3,697,507   10/1972   Frederiksen et al. ............... 260/239.1

Primary Examiner—Nicholas S. Rizzo
Attorney, Agent, or Firm—Holman & Stern

[57] ABSTRACT

A method for preparing α-aminobenzylpenicillin consisting of acylating a derivative of 6-aminopenicillanic acid, for example from an acylal derivative having the general formula

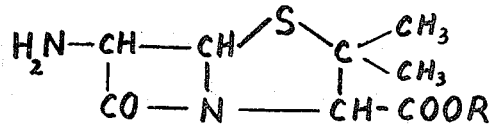

where R is a group

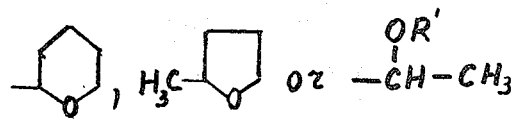

where R' is an alkyl $C_1$-$C_4$ group, an alkyl halide, aryl or aralkyl groups with an activated ester of N-substituted D(−)α-amino phenylacetic acid having the general formula

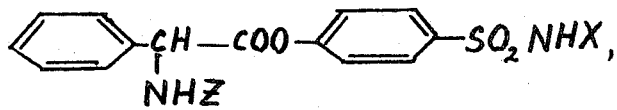

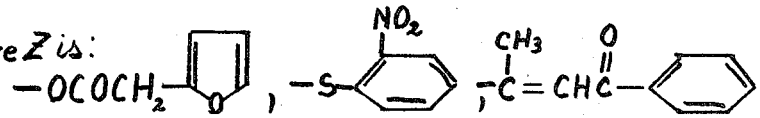

and X is either hydrogen, or 2-pyrimidyl, in an organic solvent medium with subsequent hydrolysis.

6 Claims, No Drawings

METHOD OF PREPARING α-AMINOBENZYLPENICILLIN

The present invention relates to a method for preparing α-aminobenzylpenicillin (ampicillin), and preparation has a wide antimicrobial action and is used extensively in treating diseases caused by both gram-positive and gram-negative causative agents.

The invention comprises acylating a derivative of 6-aminopenicillanic acid with activated esters of N-substituted D(−)α-aminophenylacetic acid having the general formula

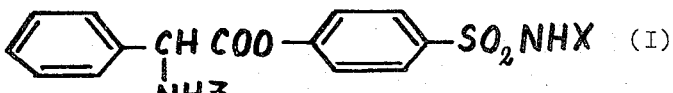

where

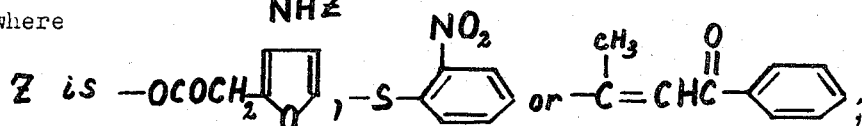

X is hydrogen or 2-pyrimidyl, in an organic solvent medium and in the presence of acetic acid with a subsequent hydrolysis step. The reaction solution resulting from the acylation and hydrolysis steps gives α-aminobenzylpenicillin. Wherever necessary, a non-toxic salt can also be obtained therefrom. The activated ester of N-substituted D(−)α-aminophenylacetic acid having the above formula (I) is obtained by protecting the corresponding amino group in the D(−)α-aminophenylacetic acid by treating it with furfuryl ester of chlorocarbonic acid or with o-nitrophenylsulphenyl chloride, or, with benzoylacetone, with a subsequent treatment of the resulting product with N-(2-pyrimidyl)-1-phenol-4-sulphonamide or 1-phenol-4-sulphonamide.

The starting material for the proposed preparation is an acylal derivative of 6-aminopenicillanic acid having the general formula

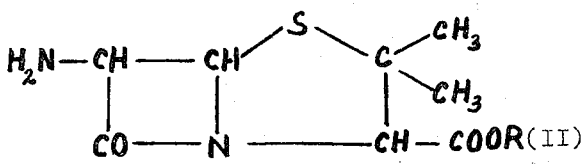

wherein R is selected from a group having the formula

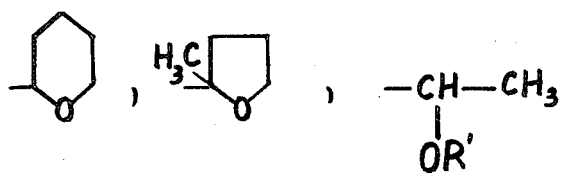

and where R' is an alkyl group of from $C_1 - C_4$, an alkyl halide, an aryl, or an aralkyl group, which is prepared, e.g., by the addition of an $\alpha, \beta$-unsaturated ether to the carboxyl group of an N-substituted 6-aminopenicillanic acid (6-APA) with subsequent removal of the moiety protecting the amino group. Salts of the 6-APA along with organic and mineral acids, as well as N-acyl derivatives of 6-APA can be used as the N-substituted derivatives of 6-APA. Thus, the acylal derivatives of 6-APA can be obtained by desacylation of acylal derivatives of penicillin G or V by known methods.

A silyl derivative of 6-aminopenicillanic acid, which may also be used as the starting compound in the described method, has the general formula

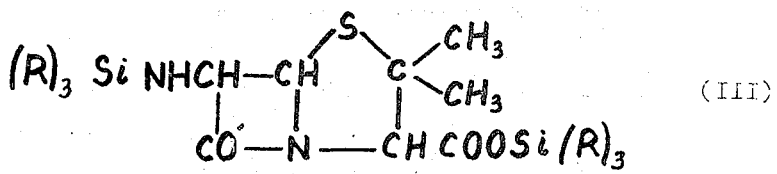

where R may be the same or different alkyl groups, and is prepared by heating a reaction mixture containing 6-APA and more than 2 gram-molecules of N-trialkylsilyldialkylamine, e.g. N-trimethylsilyldiethylamine, with a subsequent removal by distillation of the dialkylamine formed in the reaction.

According to the herein proposed method, the said derivatives of the 6-APA and the acylating agent, and the activated ester (I), can be easily reacted in the presence of acetic acid by stirring the liquid mixture of the starting compound and the acylating agent at room temperature for a few hours in a medium of methylene chloride or chloroform or other halide-containing solvents or ethylacetate.

This invention is characterized by the fact that the said acylation reaction employs an activated ester formed by treating N-substituted D(−)α-aminophenylacetic acid (in which the amino group is protected by a special radical) with phenolsulphonamide. Owing to the use of such activated esters, the acylation reaction can be effected at a low temperature with a high yield of the product.

After the product of acylation has been obtained, the protection group can be easily removed by hydrolysis, providing that the pH of the solution is maintained below 4.0 for a short time.

If the acylal derivative of 6-APA (II) is used as the starting compound, the acylation process results in an acylal derivative of N-substituted ampicillin, in which the acylal group is easily hydrolyzed under by the action of water with the formation of a free carboxyl group.

If the trialkylsilyl ester of 6-N-trialkylsilylaminopenicillanic acid (III) is used as the starting compound, the acylation results in a silyl ester of the N-substituted ampicillin. The silyl group may also be easily removable (together with the protection group or the amino moiety) in the above reaction by hydrolysis. Moreover, the silyl group can be eliminated easier if water or alcohol is added to the reaction mixture. Hence, it is necessary to keep the reaction mixture anhydrous at least until the completion of the acylation reaction.

The proposed method can be illustrated by the following examples.

EXAMPLE 1

15.1 g of D(−)α-aminophenylacetic acid are dissolved in 100 ml of a 1N solution of NaOH, to which 100 ml of dioxane are added and the solution obtained is cooled to 0°C. A freshly prepared solution of 16.1 g of furfuryl ester of chlorocarbonic acid in 500 ml of sulphuric ether are then added gradually with stirring with a current of nitrogen. 25 ml of 4N solution of NaOH are simultaneously added to the mixture to maintain the pH of the medium at 8.5–9.0. The mixture is continuously stirred with cooling for 1 hour. As soon as the reaction is completed, the aqueous-alkaline solution is separated, and washed with ether and acidified with 2N sulphuric acid to a pH of 3.0–3.5 at 0°C. The precipitated N-carbofurfuryloxy-D(−)α-aminophenylacetic acid is washed with water till the acid reaction vanishes, then dried at room temperature.

3 g of the thus obtained product, N-carbofurfuryloxy-D(−)α-aminophenylacetic acid are dissolved in 20 ml of anhydrous pyridine whereupon 2.5 g of N-(2-pyrimidyl)-1-phenol-4-sulphonamide are added. The solution is then cooled to 0°C, and 1.58 g of phosphorus oxychloride in 5 ml of methylene chloride are slowly added within 30 minutes. The reaction mixture is stirred at room temperature, and 300 ml of ice-cold water are added. The precipitated N-(2-pyrimidyl)-4-sulphonamide-1-phenyl ester of N-carbofurfuryloxy-D(−)α-aminophenylacetic acid (I) is washed several times until the odour of pyridine is absent, and then dissolved in 20 ml of methylene chloride. Magnesium sulphate is added to the solution and the contents are agitated. The solution is dehydrated and filtered.

The acylal derivative of 6-APA is prepared simultaneously, for which purpose 3 g of 6APA are suspended in 4.5 ml of formic acid at a temperature of 0–5°C. 7.5 g of $\Delta^2$-dihydropyran are then added to the prepared suspension and the mixture is stirred for 10–15 minutes until a homogeneous solution is obtained. The formed acylal formylate and excess $\Delta^2$-dihydropyran are distilled in a vacuum to give 4.3 g of an acylal of 6-APA (2-tetrahydropyranyl ester of 6-APA). The filtrate is mixed with a solution of 3.5 g of an acylal of 6-APA in methylene chloride and with the obtained ester having formula (I), and then 0.5 ml of acetic acid is added and the components are mixed for a few hours at room temperature. As the acylation reaction is completed, the methylene chloride is removed by distillation and the residue is treated with a solution of 1.6 g of hydrogen bromide in 20 ml of acetic acid at 0°C for 3 minutes. Upon completion of the hydrolysis, the solution is diluted with 2 volumes of water and washed with butyl acetate. The pH of the aqueous solution is adjusted to 5.0–5.5 by adding 10 per cent of an alkali solution and the desired product, α-aminobenzylpenicillin trihydrate, is isolated. The yield of the product is 3.2 g which is 76.1 per cent of theory. The purity of the product is 96 per cent.

EXAMPLE 2

3 g of N-[o-nitrophenylsulphenyl]D(−)α-aminophenylacetic acid are converted to N-[2-pyrimidyl]-1-phenol-4-sulphonamide ester and reacted with 3.5 g of an acylal of 6-APA obtained as described in Example 1. After distillation of methylene chloride, the prepared N-substituted ampicillin is dissolved in acetone, diluted with an equal volume of water, acidified with hydrochloric acid to a pH of 2.0 stirred for 2 hours at 0°–1°C whereupon the acetone is distilled off. The remaining aqueous solution is washed with butyl acetate and the pH of the aqueous layer is adjusted to 5.0–5.5 by adding alkali and the solution is evaporated in vacuum. The resultant product is 5.0 g of ampicillin trihydrate. The purity of the product is 35 per cent.

EXAMPLE 3

3.0 g of N-[1-methyl-2-benzoylvinyl]-D(−)α-aminophenylacetic acid are converted to N(2-pyrimidyl)-1-phenol-4-sulphonamide ester and condensed with 3.5 g of acylal of 6-APA obtained by reacting 6-APA with 2-methyl-$\Delta^2$-dihydrofuran under the conditions described in Example 1. N-substituted ampicillin is hydrolyzed under the conditions described in Example 2. The resultant product is 4.0 g of ampicillin trihydrate. The purity of the product is 30 per cent.

EXAMPLE 4

3.0 g of N-carbofurfuryloxy-D(−)α-aminophenylacetic acid are converted to N-[2-pyrimidyl]-1-phenol-4-sulphonamide ester and reacted with 3.6 g of a trimethylsilyl ester of 6-N-trimethylsilylaminopenicillanic acid in methylene chloride, whereupon 0.5 ml of acetic acid is added and the components are stirred for a few hours at room temperature. Upon termination of the reaction of acylation, the methylene chloride is removed by distillation, and the residue is treated as described in Example 1. The yield of the desired product is 3.25 g, which is 77.4 per cent of theory. The purity of the product is 96 per cent.

EXAMPLE 5

3.0 g of N-[o-nitrophenylsulphenyl]D(−)α-aminophenyl acetic acid are converted to N-[2-pyrimidyl]-1-phenol-4-sulphonamide ester and reacted with 3.6 g of a silyl derivative of 6-aminopenicillanic acid (III) under the conditions described in Example 4. After the methylene chloride has been distilled off, the remaining N-substituted ampicillin is dissolved in acetone, diluted with an equal volume of water, acidified with hydrochloric acid in order to adjust the pH of the medium to 2.0, stirred for 2 hours at 0°–1°C whereupon the acetone is distilled off. The remaining aqueous solution is washed with butyl acetate, and the pH of the aqueous layer adjusted to 5.0–5.5 by adding alkali, and the aqueous layer evaporated in vacuum. The resulting product is 4.6 g of ampicillin trihydrate. The purity thereof is 35 per cent.

EXAMPLE 6

3.0 g of N-[1-methyl-2-benzoylvinyl]-D(—)α-aminophenylacetic acid are converted to N-[2-pyrimidyl]-1-phenol-4-sulphonamide ester and condensated with 3.5 g of silyl derivative of 6-aminopenicillanic acid under the conditions described in Example 4. The N-substituted ampicillin is hydrolyzed under the conditions described in Example 2 to obtain 5.6 g of ampicillin trihydrate. The purity of the product is 25 per cent.

What we claim is:

1. A method for preparing α-aminobenzylpenicillin comprising reacting an acylal derivative of 6-aminopenicillinanic acid with an activated ester of N-protected D(—)α-aminophenylacetic acid having the formula:

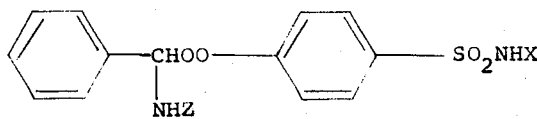

where Z is selected from the group consisting of:

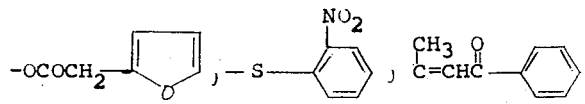

X is selected from the group consisting of hydrogen and 2-pyrimidyl, at room temperature in a reaction-inert organic solvent medium in the presence of acetic acid, and hydrolyzing the reaction product to remove the protecting groups.

2. A method as claimed in claim 1, in which the acylal derivative of the 6-aminopenicillanic acid has the formula

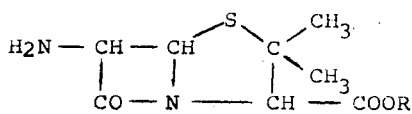

where R is a moiety selected from the group consisting of

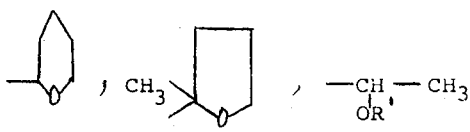

where R' is selected from the group consisting of an alkyl of from $C_1$–$C_4$, β-chloroethyl, phenyl and benzyl.

3. A method as claimed in claim 2, in which an acylal derivative of 6-aminopenicillanic acid obtained by reacting an α,β-unsaturated ether selected from the group consisting of

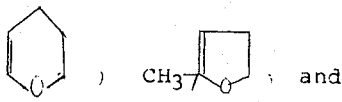

$CH_2 = CH - OR'$, where R' is selected from the group consisting of an alkyl of from $C_1$ – $C_4$, β-chloroethyl, phenyl and benzyl, is used to form the N-substituted-6-aminopenicillanic acid.

4. A method as claimed in claim 1, in which a trialkylsilyl derivative having the general formula

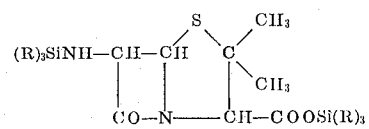

where R is alkyl, is used to form the derivative of 6-aminopenicillanic acid.

5. A method as claimed in claim 1, in which methylene chloride is used as the organic solvent.

6. An acylal derivative of 6-aminopenicillanic acid wherein the acylal moiety has the formula

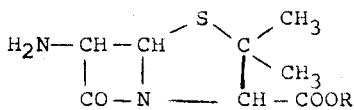

where R is selected from the group consisting of

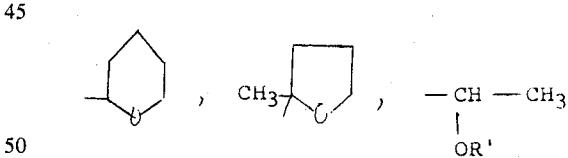

where R' is selected from the group consisting of an alkyl of from $C_1$–$C_4$, β-chloroethyl, phenyl and benzyl.

* * * * *